Aug. 11, 1936.     Á. BARÉNYI     2,050,874
ROLL FILM CAMERA
Filed May 17, 1935
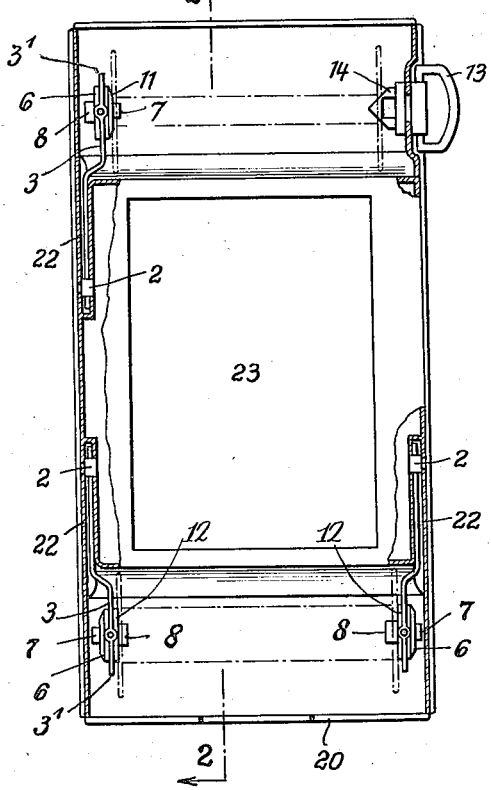
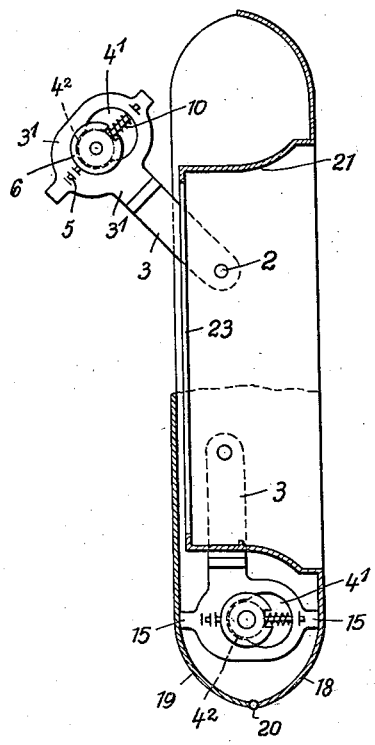
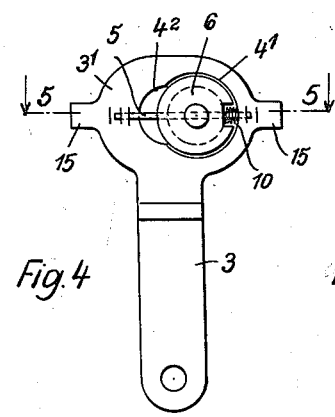
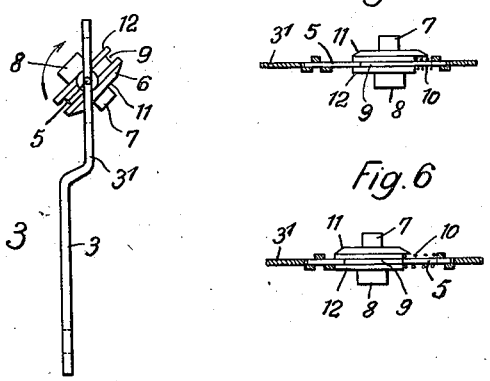
INVENTOR
Árpád Barényi
By Franz Reinhold
ATTORNEY Patented Aug. 11, 1936

2,050,874

UNITED STATES PATENT OFFICE 2,050,874

ROLL FILM CAMERA

Árpád Barényi, Berlin-Lichterfelde, Germany, assignor to Voigtländer & Sohn Aktiengesellschaft, Brunswick, Germany, a joint stock company of Germany Application May 17, 1935, Serial No. 22,047
In Germany June 19, 1934

12 Claims. (Cl. 242—71)

My invention relates to improvements in roll film cameras, and more particularly in the construction of spool holders which are adapted to have spools of different types or dimensions mounted thereon, and which for this purpose are constructed so as to be adapted to spools of different lengths and different sizes of the sockets by means of which they are mounted on the spool holders. One of the objects of the improvements is to provide a spool holder of this type which is simple in construction and which provides a reliable support for spools of the various types in contemplation, and with this object in view my invention consists in providing the spool holder with a plurality of pivot members corresponding to the different types of spools and adapted to be brought alternately to service position.

Other objects of the improvements will appear from the following description.

For the purpose of explaining the invention an example embodying the same has been shown in the accompanying drawing in which the same reference characters have been used in all the views to indicate corresponding parts. In said drawing, Fig. 1 is a view, partly in rear elevation, partly in section, of the camera of the invention, the rear section of the casing being removed.

Fig. 2 is a sectional elevation taken on the line 2—2 of Fig. 1. In this figure one of the spool-holders is shown in the position to which it is swung for the purpose of making adjustment. In this figure a portion of the rear section of the casing is broken away.

Fig. 3 is an elevation of one of the spool holders, the spool holding member being shown in course of turning, in order to bring one pivot member into operative position and the other one into inoperative position.

Fig. 4 is an elevation of Fig. 3 showing the spool holding member in the position after being turned and before being locked, Fig. 5 is a sectional view taken on the line 5—5 of Fig. 4, and Fig. 6 is a similar sectional view showing the spool holding member in locked position.

In the construction shown in the figures the camera comprises a casing made in two sections 18 and 19 hinged to each other at 20. The front section 18 is formed with an inwardly directed portion 21 spaced from the side walls and affording the exposure opening 23. The said walls of the section 18 are throughout portions of their extent made double, to provide slots or pockets 22.

In the said pockets flat supporting members 3 forming parts of the spool holders are located, which are supported on pivot bolts 2 so that they may be swung out of the camera and into the position shown in Fig. 2. Preferably the supporting member carries a spool-holding member which is movable therein for bringing the desired pivot member into operative position, the said spool-holding member preferably taking the form of a disk having pivot members provided on its opposite sides and being so mounted on its supporting member that it is adapted to be turned about a diametrical axis for bringing either of such pivot members into operative position. Each of the said supporting members 3 is formed with an inwardly cranked enlarged outer part $3^1$ which is formed with a cut-out area comprising a large segmental portion $4^1$ and a smaller segmental portion $4^2$. In the said cut-out area the spool-holding member 6 is located which takes the form of a circular disk somewhat smaller in diameter than the segmental portion $4^1$, the said disk being formed with a circumferential groove 9 the inner diameter of which is equal to the diameter of the segmental portion $4^2$. The disk 6 is mounted on an axle in the form of a steel wire 5 passed through a diametrical bore thereof and extending transversely through the cut-out area and fixed with its ends to the outer part $3^1$ of the supporting member. Thus the spool-holding member 6, when it is located within the portion $4^1$, may be turned about the axle 5; and, when it is located in the portion $4^2$, it is locked in position, the margin of the said portion engaging in the groove 9. Between the member 6 and the wall of the portion $4^1$ a coiled spring 10 is placed around the pivotal wire 5, which tends to push the spool holding member 6 with its groove 9 into the cut-out portion $4^2$ and into locking engagement with the wall thereof.

The disk 6 is provided on opposite sides with outstanding pintles 7 and 8, which are cylindrical in shape and unequal in diameter, corresponding in such variety in diameter to the sockets of the various spools intended to be used in the camera. Thus the pintle 7 is smaller in diameter than the pintle 8, and when a spool is used in which the sockets are small the pintle 7 is set in operative position, as is shown in Fig. 1, and if a spool is used which is formed with a large socket the pintle 8 is set in operative position. In each case the spool finds a reliable bearing on the pintle, because both pintles are cylindrical in shape, so that the film spools may smoothly turn on their holding members.

In many cases the spools to be used in the camera are different in length, and therefore also the end faces of the spool holding member 6 that engage the end faces of the spools must in the alternative service positions be located, in one case nearer to, in the other case farther away from, the end wall of the camera, and for this purpose the diametrical bore by means of which the disk 6 is mounted on the pivotal wire 5 is not located at the middle of the disk, but nearer to one of the end faces 11 and 12 than to the other. In the example shown in Fig. 3 the said bore is located nearer to the end face 12 than to the end face 11. The end face 11 with its pintle 7 affords (when in operative position) support for a spool of smaller length and of smaller socket; and the end face 12 with its pintle 8 affords support for a longer spool with larger socket. Thus the spools of various size find adequate support.

The portions 3' of the supporting members 3 are formed at opposite sides with lugs 15 which when the spool-holder is in operative position and the camera is closed, as is shown at the bottom part of Fig. 2, bear on the walls of the sections 18 and 19 thus holding the spool holders in the correct positions.

The film winding key 13 is formed in the usual way with an inwardly tapering flat portion 14 adapted to engage the spool.

The spool holder is used as follows: If it is desired to use a spool of dimensions other than those of the spool last previously used in the camera, the photographer moves the spool holder out of the camera casing and into the position shown in Fig. 2, he retracts the disk 6 out of the portion 4² and into the portion 4¹ of the cut-out portion against the action of the spring 10, whereupon he turns the disk 6 about the pivotal wire 5, as is indicated in Fig. 3, for reversing the positions of the pintles. Now the film holding disk 6 is located within the cut-out portion 4¹, as is shown in Figs. 4 and 5, and the photographer allows the disk 6 to be pushed by the spring 10 into the cut-out portion 4², whereupon the disk is locked in position, as is shown in Fig. 6. Now the spool is placed on the portion 14 of the key, and the supporting member 3 is turned about its pivot bolt 2 and into the camera casing, whereupon the section 19 is closed. The sections 18 and 19 bear on the lugs 15 and thus hold the spool holder within the camera in the correct position.

The film winding key 13, 14 may be similar in construction to the spool holder comprising the disk 6, or another known or preferred construction may be used in lieu thereof for adapting the key to spools of different lengths.

I claim:

1. In a roll-film camera, a spool holder comprising a supporting member and a spool-holding member adjustably mounted thereon and provided with a plurality of spool-holding pintles of different diameters adapted selectively to be set into spool-holding position.

2. A spool holder as claimed in claim 1, in which the spool-holding member is provided at opposite sides with the spool-holding pintles, and is mounted on the body of the supporting member for being turned thereon with either one of said spool-holding pintles in spool-holding position.

3. A spool holder as claimed in claim 1, in which the spool-holding member is formed with end faces adapted for engagement with the end faces of spools of different dimensions and located when in alternate operative positions different distances away from the end wall of the camera.

4. A spool holder, comprising a supporting member and a spool holding member mounted thereon and formed at opposite sides with spool-holding pintles of different dimensions and with end faces adapted for engagement with the end faces of the spools, said spool-holding members being mounted on the spool-holder for being turned about an axis located transversely of the axis of said pintles and different distances away from said end faces of the spool-holding member.

5. A spool holder as claimed in claim 1, comprising in addition means for locking the spool-holding member with any one of its pintles in spool-holding position.

6. In a roll-film camera, a spool holder, comprising a supporting member formed with a cut-out area, an axle extending across said cut-out area, a spool-holding member formed at opposite sides with spool-holding pintles pivotally mounted upon and shiftable longitudinally upon said axle, a portion of such cut-out area being a a size permitting the turning of the spool-holding member when at one end of its range of shift longitudinally of the axle, and another portion of said cut-out area being of a size corresponding to that of said spool-holding member, the supporting member being adapted by engagement with the spool-holding member to secure said spool-holding member against turning upon its axle when said spool-holding member is at the opposite end of its range of shift longitudinally of the axle, and means tending to shift said spool-holding member longitudinally on said axle to its position of turn-preventing engagement by said supporting member.

7. A spool holder as claimed in claim 6, in which the spool-holding member is formed with a circular groove adapted for locking engagement with said supporting member.

8. In a roll-film camera, a spool holder, comprising a supporting member, an axle fixed to said supporting member, a spool-holding member mounted on said axle and shiftable longitudinally and rotatable thereon, said supporting member being adapted to engage the otherwise free spool-holding member when the spool-holding member is at one end of its range of longitudinal shift upon said axle and by engagement to secure it from turning, and means tending to shift said spool-holder on said axle to the position of engagement by the said supporting member.

9. A spool holder as claimed in claim 8, in which the means tending to shift the spool-holding member consists of a spring.

10. In a roll-film camera, a spool holder, comprising a flat supporting member and formed with a cut-out area comprising a segmental part of large diameter and a segmental part of small diameter merging into the same, an axle fixed to said supporting member and extending across said cut-out area and through the segmental part of large diameter and the segmental part of small diameter, a circular spool-holding disk on said axle formed at opposite sides with spool-holding pintles, said spool-holding disk having a diameter less than the diameter of the segmental part of large diameter and larger than the diameter of the segmental part of smaller diameter and being formed with a circumferential groove having a diameter substantially equal to the diameter of the segmental part of smaller diameter, and a spring tending to shift said spool-holding member upon the axle from the part of large diameter into the part of small diameter.

11. A spool holder as claimed in claim 1, in which the spool-holding member is cylindrical in shape.

12. A spool holder as claimed in claim 1, in combination with a camera casing on which the spool holder is pivotally mounted so as to be adapted to be turned out of the said casing.

ÁRPÁD BARÉNYI.